US006297605B1

(12) United States Patent
Butler et al.

(10) Patent No.: US 6,297,605 B1
(45) Date of Patent: Oct. 2, 2001

(54) PINCH SENSING ARRANGEMENT FOR A MOTOR VEHICLE POWER LIFTGATE

(75) Inventors: Frederick C Butler, Davisburg, MI (US); Peter L Oxley, Mt Albert (CA)

(73) Assignees: DaimlerChrysler Corporation, Auburn Hills, MI (US); Atoma International Corporation, Newmarket (CA)

( * ) Notice: Subject to any disclaimer, the term of this patent is extended or adjusted under 35 U.S.C. 154(b) by 0 days.

(21) Appl. No.: 09/520,644

(22) Filed: Mar. 7, 2000

(51) Int. Cl.[7] ........ H02P 3/00

(52) U.S. Cl. ........ 318/466; 318/466; 200/61.43; 200/61.44; 49/26; 49/28; 49/324

(58) Field of Search ........ 49/28, 26, 324; 200/61.43, 61.44; 318/468, 469, 466

(56) References Cited

U.S. PATENT DOCUMENTS

| | | | | |
|---|---|---|---|---|
| 3,782,034 | * | 1/1974 | Lynn et al. | 49/13 |
| 4,273,974 | * | 6/1981 | Miller | 200/61.43 |
| 4,532,388 | * | 7/1985 | Sackmann et al. | 200/61.43 |
| 4,920,241 | * | 4/1990 | Miller | 200/86 R |
| 5,027,552 | * | 7/1991 | Miller et al. | 49/27 |
| 5,157,230 | * | 10/1992 | Blubaugh | 200/61.43 |
| 5,259,143 | * | 11/1993 | Mitchell et al. | 49/27 |
| 5,296,658 | * | 3/1994 | Kramer et al. | 200/61.43 |
| 5,448,856 | * | 9/1995 | Moore et al. | 49/340 |
| 5,531,498 | | 7/1996 | Kowall | 296/146.4 |
| 5,563,483 | | 10/1996 | Kowall et al. | 318/283 |
| 5,592,060 | * | 1/1997 | Racine et al. | 318/469 |
| 5,728,984 | * | 3/1998 | Miller | 200/61.43 |
| 5,832,665 | * | 11/1998 | Miller et al. | 49/27 |
| 5,962,825 | * | 10/1999 | Miller | 200/61.43 |
| 5,982,126 | * | 11/1999 | Hellinga et al. | 318/468 |
| 6,038,930 | * | 3/2000 | Lehnen et al. | 73/774 |
| 6,172,315 | * | 1/2001 | Miller et al. | 200/61.73 |

* cited by examiner

*Primary Examiner*—Robert E. Nappi
*Assistant Examiner*—Rita Leykin
(74) *Attorney, Agent, or Firm*—Mark P. Calcaterra

(57) ABSTRACT

A pinch sensing arrangement for a motor vehicle power liftgate mounted to the body of the motor vehicle and driven by a drive mechanism between an open position and a closed position. The pinch sensing arrangement includes a mounting track, a sensor and a control module. The mounting track is attached to the liftgate. The sensor is attached to the mounting track and elongated along at least one of the lateral sides of the liftgate. The sensor is operative for generating an electrical signal when compressed. The control module is in electrical communication with the sensor and is adapted to control the drive mechanism to articulate the liftgate to the open position upon receiving the electrical signal.

18 Claims, 5 Drawing Sheets

PINCH SENSING ARRANGEMENT FOR A MOTOR VEHICLE POWER LIFTGATE

BACKGROUND OF THE INVENTION

1. Technical Field

The present invention generally pertains to motor vehicles. More particular, the present invention pertains to pinch sensing arrangement for a motor vehicle closure panel. More specifically, but without restriction to the particular embodiment and/or use which is shown and described for purposes of illustration, the present invention relates to a pinch sensing arrangement for a motor vehicle power liftgate.

2. Discussion

In motor vehicles such as minivans, sport utility vehicles and the like, it has become common practice to provide the vehicle body with a large rear opening. A liftgate (also referred to as a tailgate) is typically mounted to the vehicle body with hinges for pivotal movement about a transversely extending axis between an open position and a closed position. Typically, the liftgate is operated manually. However, it has been heretofore proposed to provide a power drive mechanism including a reversible electric motor to operate the door. For example, such arrangements are shown in commonly assigned U.S. Pat. Nos. 5,531,498; 5,563,483; and 5,448,856, which are hereby incorporated by reference as if fully set forth herein.

During power operation of a vehicle liftgate, the liftgate may unexpectedly encounter an obstacle in its path. It is therefore desirable to cease its powered movement in that event to prevent damage to the obstacle and/or the liftgate and its power actuator. U.S. Pat. No. 5,448,856 discloses a powered liftgate system including a feature for stopping the liftgate movement upon encountering an obstacle. In this system, a powered actuator with a reversible DC motor and a worm gear driven crank arm, efficiently operates the liftgate through a roller and guide with gas spring assist. The motor current is monitored by a control circuit that interrupts the power to the actuator motor to stop the liftgate when the current exceeds a certain level as occurs when the liftgate encounters an obstacle.

While known systems for stopping liftgate movement upon encountering an obstacle have proven adequate, it has been found that certain further precautionary features with respect to the liftgate operation are desirable and that they can be accomplished in a cost effective manner.

SUMMARY OF THE INVENTION

Accordingly, it is a general object of the present invention to provide an improved pinch sensing arrangement for a motor vehicle.

In one form, the present invention provides a pinch sensing arrangement for a closure member of a motor vehicle. The closure member is mounted for articulation relative to a body portion of the motor vehicle and is driven by a drive mechanism between an open position and a closed position. The pinch sensing arrangement includes a mounting track adapted to be attached to one of the closure member and the body portion of the vehicle. The mounting track includes a resiliently deflectable portion. The pinch sensing arrangement additionally includes a sensor attached to the resiliently deflectable portion of the mounting track and elongated in a second direction substantially perpendicular to the first direction. The sensor is operative for generating an electrical signal when compressed. The pinch sensing arrangement further includes a control module in electrical communication with the sensor. The control module is adapted to control the drive mechanism to articulate the closure member to the open position upon receiving the electrical signal. The mounting track can deflect after the sensor is compressed to allow the drive mechanism to react without damage to the obstacle or closure member.

In another form, the present invention provides a motor vehicle including a body and a liftgate. The liftgate is mounted to the body for articulation about a laterally extending pivot axis between an open position and a closed position. A drive mechanism drives the closure member between the open position and the closed position. The motor vehicle additionally includes a sensor carried by the liftgate. The sensor is operative for generating an electrical signal when compressed in a first direction under a first predetermined load. The motor vehicle further includes a control module in electrical communication with the sensor. The control module is operative for controlling the drive mechanism to articulate the liftgate to the open position upon receiving the electrical signal.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
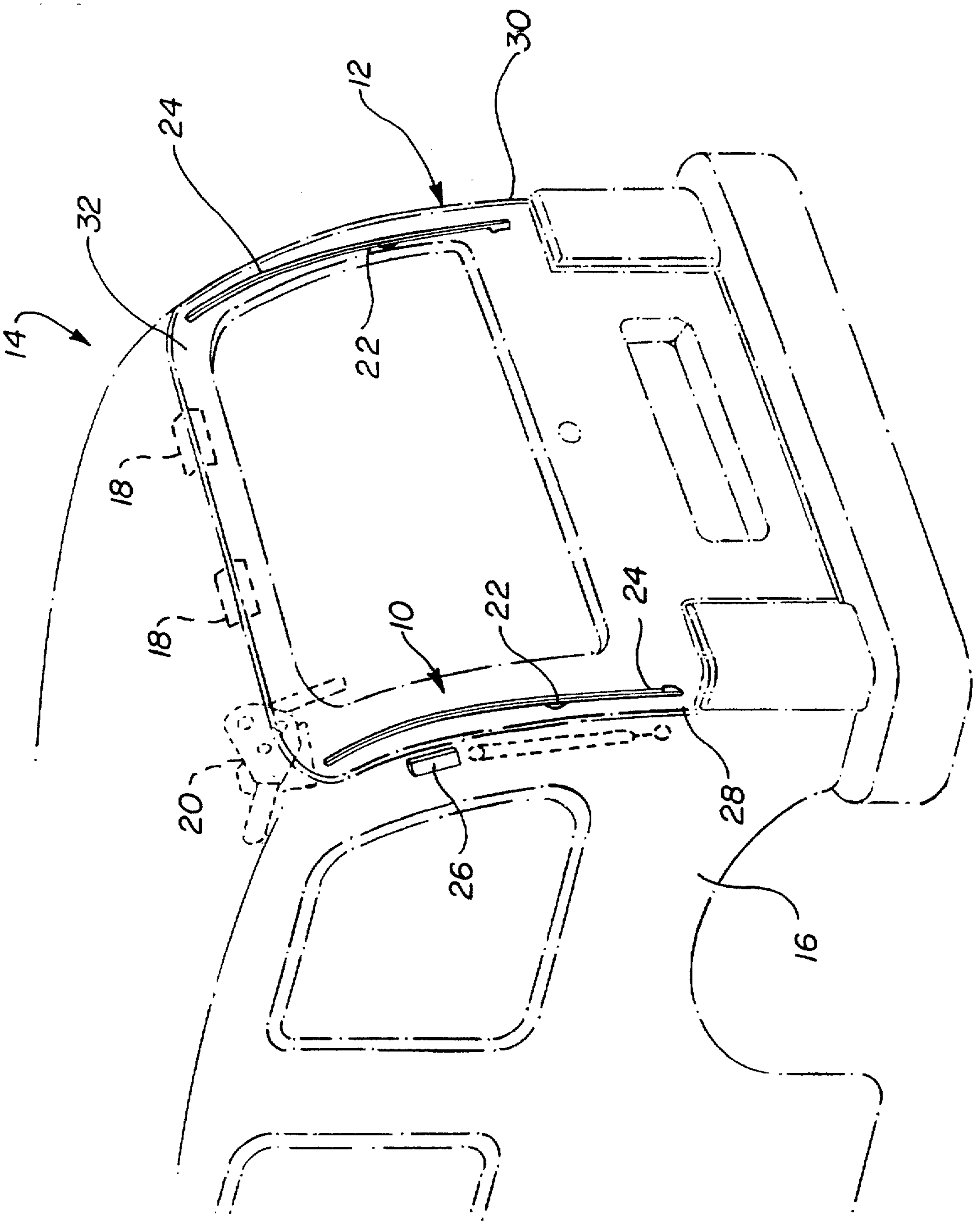
FIG. 1 is a rear perspective view of an exemplary motor vehicle incorporating a pinch sensing arrangement for a power liftgate of a motor vehicle constructed in accordance with the teachings of a preferred embodiment of the present invention operatively associated with an exemplary motor vehicle.
Figure 2:
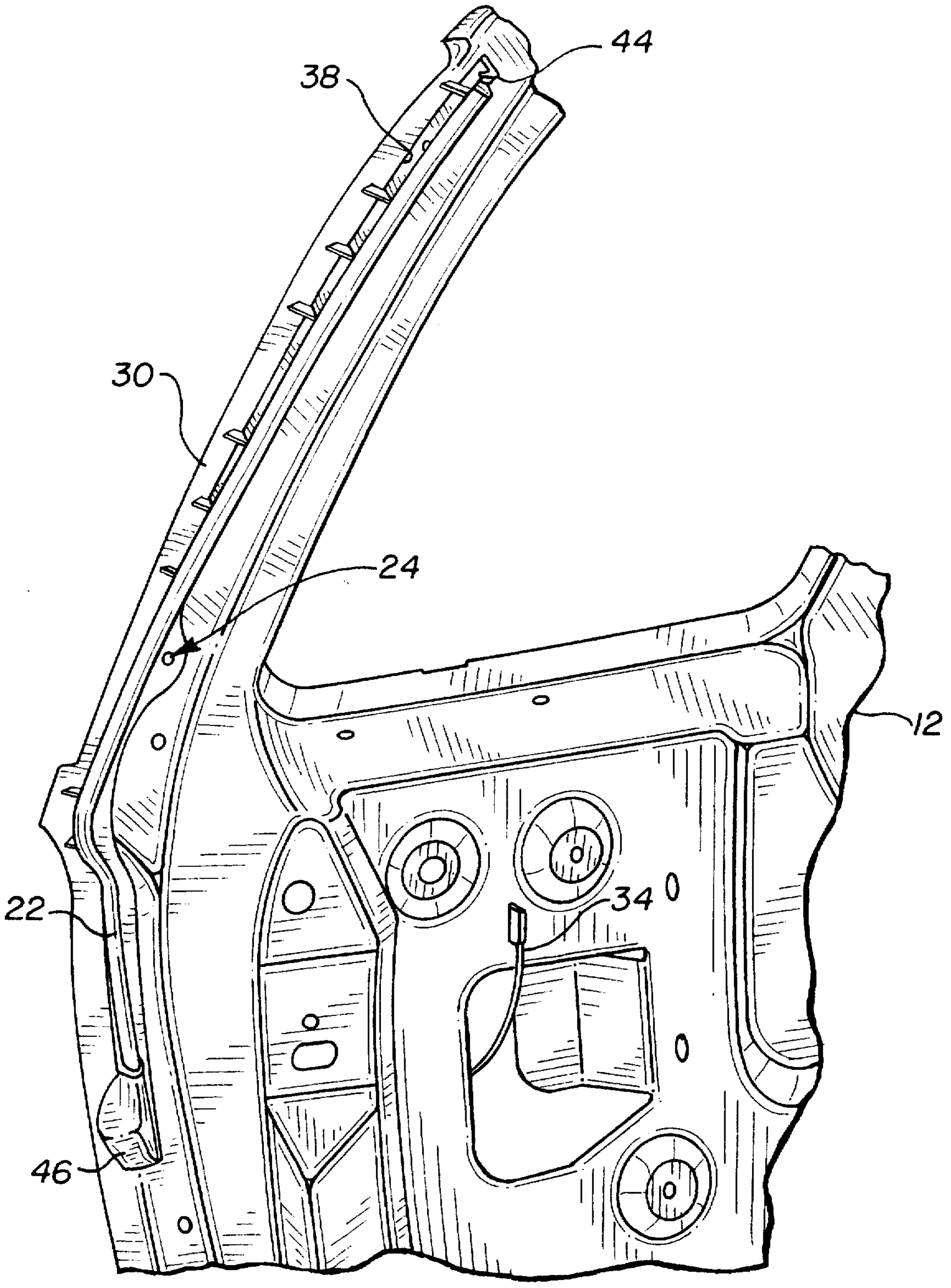
FIG. 2 is a view of a portion of an inner side the liftgate of FIG. 1 with portions removed for further illustration of the pinch sensing arrangement of the present invention.
Figure 3:
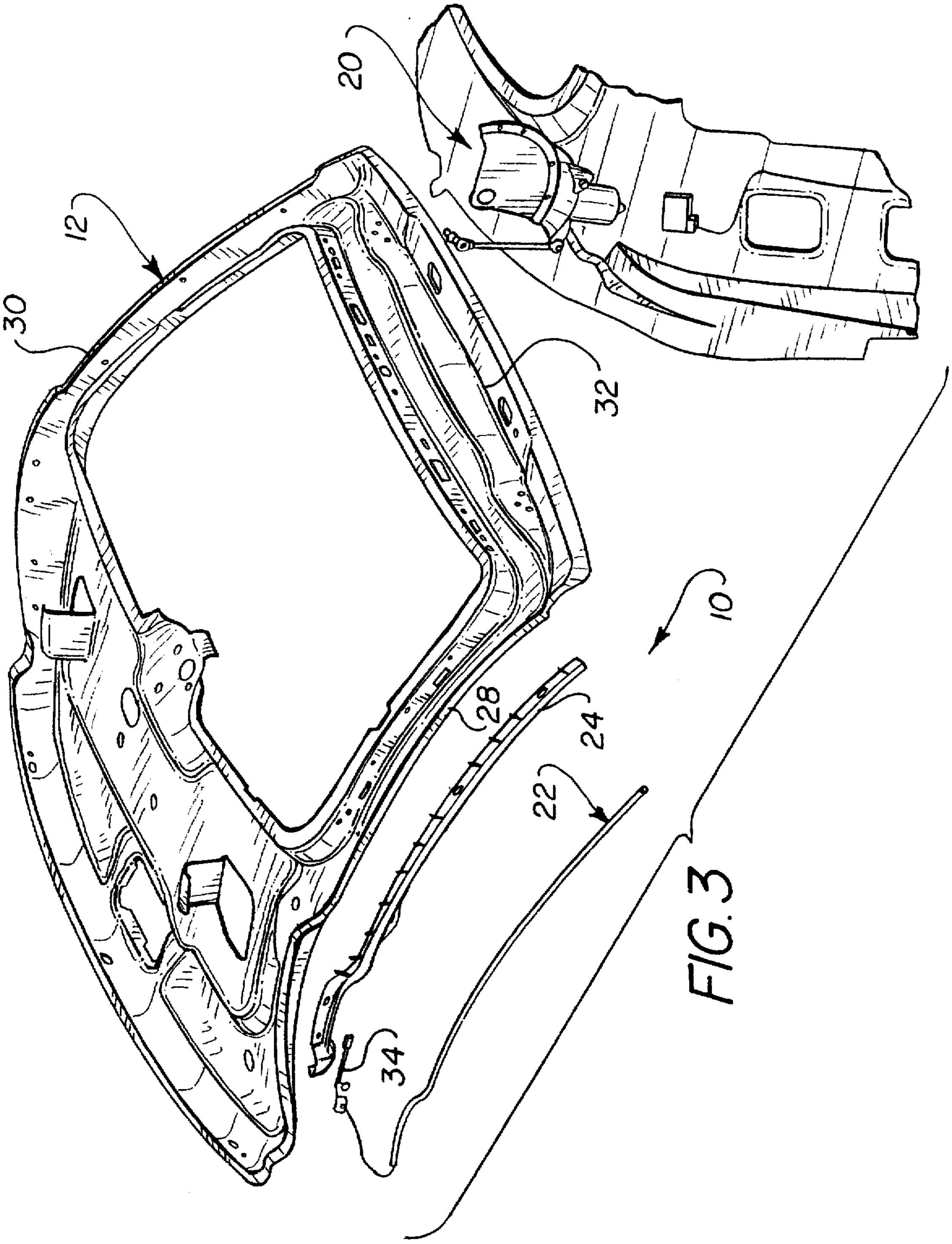
FIG. 3 is a partially exploded view of the liftgate of FIG. 1, further illustrating the pinch sensing arrangement of the present invention.

With Initial reference to FIGS. 1 through 3, a pinch sensing arrangement constructed in accordance with the present invention is generally identified with reference numeral 10. The pinch sensing arrangement 10 is shown operatively associated with a closure panel 12 of a motor vehicle 14. In the embodiment illustrated, the closure panel is a liftgate 12. It was be understood by those skilled in the art that the particular use of the teachings of the present invention shown throughout the drawings is merely exemplary.

The liftgate 12 is mounted to a body 16 of the motor vehicle 14 through a pair of hinges 18 to pivot about a transversely extending pivot axis with respect to a large opening in the rear of the body 16. The liftgate 12 is mounted to articulate about its hinge axis between a closed position where it closes the opening and an open position where it completely uncovers the opening for free access to the vehicle body interior and assumes a slightly upwardly angled position above horizontal. The liftgate 12 is secured in its closed position by a latching mechanism (not shown). The liftgate 12 is opened and closed by a drive mechanism 20 with the assist of a pair of gas springs (one of which is identified at reference numeral 22) connected between the liftgate 12 and the body 16. Insofar as the present invention is concerned, the drive mechanism 20 is conventional.

The pinch sensing arrangement 10 of the present invention is shown to generally include at least one sensor 22, a mounting track 24 for each of the sensors 22, and a controller 26. One suitable sensor 22 is commercially available from British Tire and Rubber Company for power window applications. The sensor 22 is an elongated structure having a pair of contacts (not shown) extending along its length. The contacts are substantially encapsulated in a epdm rubber and are normally spaced apart. When the sensor 22 is compressed in a direction substantially parallel to its length, the pair of contacts are closed so as to generate an electrical signal.

In the exemplary embodiment illustrated, the pinch sensing arrangement 10 is shown to include a pair of sensors 22 positioned proximate to laterally opposing sides 28 and 30 of the liftgate 12. Both of the sensors 22 include an upper end in close proximity to an upper lateral edge 32 of the liftgate 12. The sensors 22 extend downwardly from their upper ends along a substantial portion of the liftgate 12. The sensors 22 are both electrically attached to a wire harness 34 adapted to plug into the controller 26. In a conventional manner, the controller 26 controls the drive mechanism 20 to open the liftgate 12 in the event it receives an electrical signal from one of the sensors 22.

In the exemplary embodiment illustrated, each of the sensors 22 is mounted to the liftgate 12 through a mounting track 24. The mounting tracks 24 are substantial mirror images of one another. For this reason, only one of the mounting tracks 24 needs to be described herein. As will become apparent below, the mounting track 24 provides a mounting surface for the sensor 22 which can deflect after the sensor 22 compresses and sends the control signal to the controller 26. This deflection allows the controller 26 sufficient time to reverse the drive mechanism 20 without damaging the obstruction, the liftgate 12 or the drive mechanism 20. The mounting track 24 also provides a gradually changing surface to which the sensor 22 can be mounted. In the exemplary embodiment, the sensors 22 are mounted to the mounting tracks 24, which are in turn attached to the liftgate 12. Alternatively, it will be understood that in certain applications it may be desirable to mount the sensors 22 and their associated tracks 24 to the body 16 of the motor vehicle 14 adjacent the closure member 12.

The mounting track 24 includes a first portion or side 38 which is generally configured to mate with one of the lateral sides 28 or 30 of the liftgate 12. The first side 38 includes a plurality of mounting apertures 40 for securing the mounting track 24 to the body 16 of the motor vehicle 14 with fasteners (not shown). The mounting track 24 may alternatively be secured to the body 16 with adhesive. The first side 38 of the mounting track 24 is further shown to include a plurality of ribs 42. The ribs function to prevent the mounting track 24 from pulling away from the liftgate 12 as the sensor 22 is being compressed.

The mounting track 24 is further shown to include a second portion or second side 44. The associated sensor 22 is adhesively secured to the second side 44. The second side 44 of the mounting track 24 is oriented generally perpendicular to the first side 38 and spaced from the liftgate 12. The second side 44 is resiliently deflectable relative to the first side 38 so as to permit the sensor 22 to be slightly displaced after it is compressed.

Figure 4:
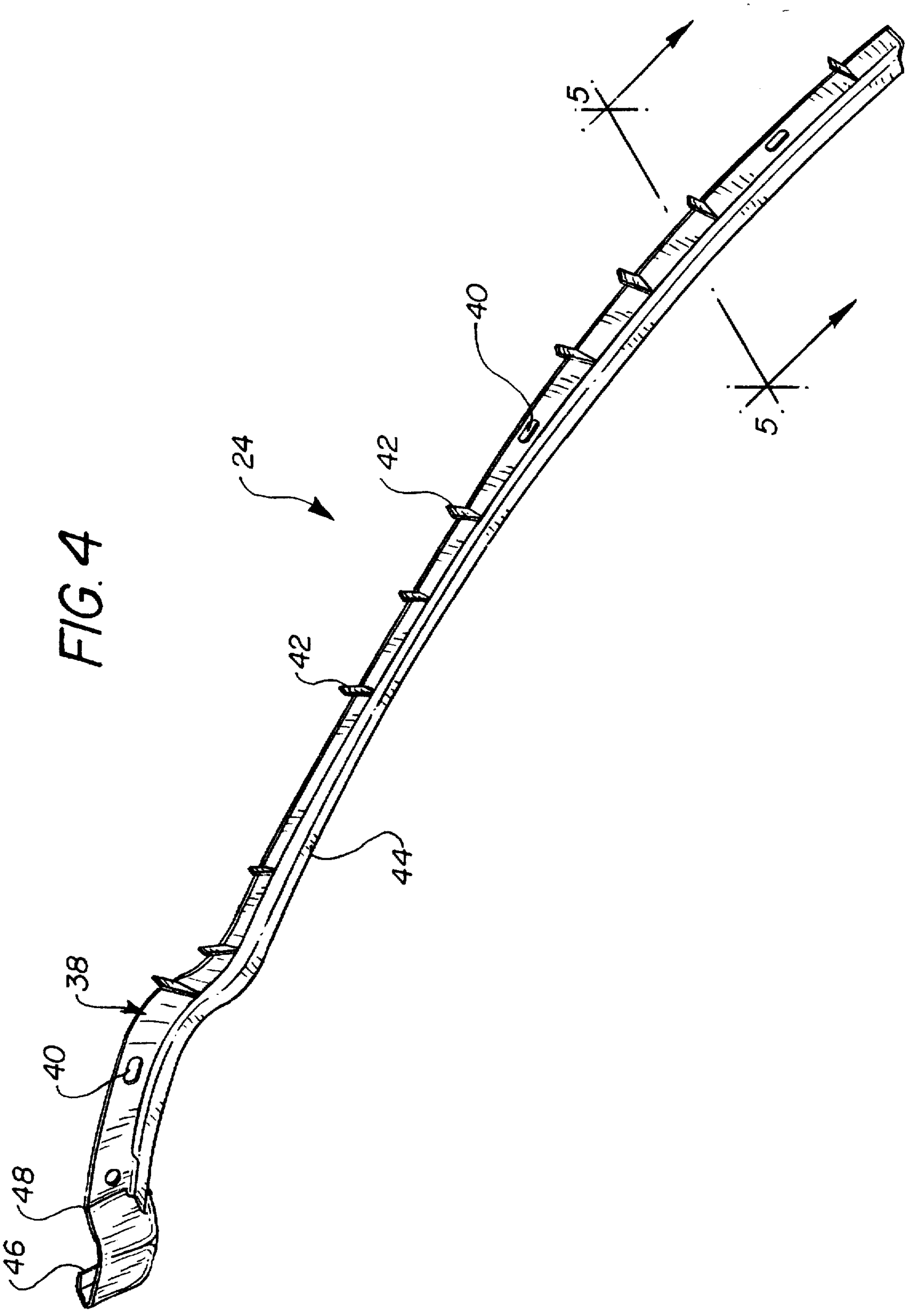
FIG. 4 is a perspective view of the mounting track of the pinch sensing arrangement of the present invention shown removed from the environment of FIG. 1 for purposes of illustration.
Figure 5:
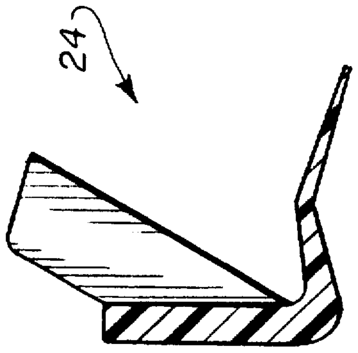
FIG. 5 is cross-sectional view taken along the line 5—5 of FIG. 4.
Figure 6:
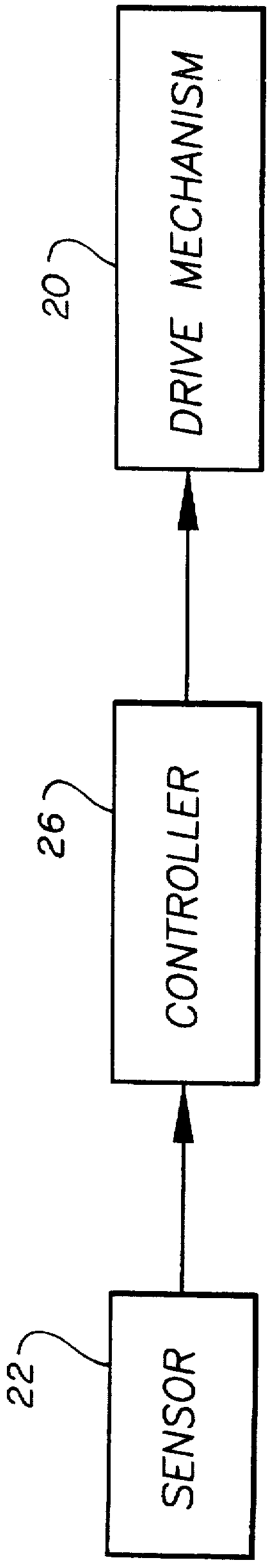
FIG. 6 is a schematic view illustrating the pinch sensor of FIG. 1 operatively associated with the controller and drive mechanism of the present invention.

As shown particularly in FIGS. 2 and 4, the mounting track 24 includes a lower end 46 formed to include a living hinge 48. The living hinge 48 functions to conceal the wire harness 34. In the exemplary embodiment, the mounting tracks 24 are unitarily constructed of a thermoplastic material through an injection molding procedure.

In operation, when the liftgate 12 encounters an obstacle proximate to the sensor 22 as it is articulated towards its closed position, the sensor 22 is compressed. A first predetermined load causes the contacts of the sensor 22 to meet and send an electrical control signal to the controller 26. In response, the controller 26 reverses the drive mechanism 20 to articulate the liftgate 12 to its open position. As the load applied to the sensor 22 increases to a slightly greater value, the second side 44 of the mounting track 24 is bent relative to the first side 38. This flexibility of the mounting track 24 allows the sensor to be displaced generally in the direction of liftgate movement and provides the drive mechanism 20 with time to respond without damaging the obstacle, the liftgate 12 or the drive mechanism 20. In the preferred embodiment, the pinch sensing arrangement 10 is adapted to reverse the drive mechanism 20 prior to generating a pinch load of approximately 100 newtons.

It will be understood that in certain applications it may be desirable to supplement the pinch sensing arrangement 10 of the present invention with a control circuit which monitors motor current and interrupts the power to the drive mechanism 20 to stop the liftgate 12 when the current exceeds a certain level as occurs when the liftgate encounters an obstacle. As discussed above, such an arrangement is disclosed in commonly assigned U.S. Pat. No. 5,448,856.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims. For example, it will be understood that the teachings of the present invention are applicable for closure members other than liftgates driven under power. Such other closure panels include, but are not limited to power windows, tailgates, and sliding doors.

What is claimed is:

1. A pinch sensing arrangement for a closure member of a motor vehicle, the closure member is mounted for articulation relative to a body portion of the motor vehicle driven by a drive mechanism between an open position and a closed position, the pinch sensing arrangement comprising:

a mounting track adapted to be attached to one of the closure member and the body portion of the vehicle, said mounting track including a resiliently deflectable portion;

a sealed sensor attached to said resiliently deflectable portion of said mounting track and spaced apart from the closure member, said sensor being elongated in a second direction substantially perpendicular to said first direction, said sensor being operative for generating an electrical signal when compressed; and a control module in electrical communication with said sensor, said control module adapted to control said drive mechanism to articulate the closure member to the open position upon receiving said signal;

wherein the mounting track and the sensor are discrete elements and wherein the resiliently deflectable portion permits the sensor to be displaced after the electric signal has been generated.

2. The pinch sensing arrangement for a closure panel of a motor vehicle of claim 1, wherein said mounting track is adapted to be attached to the closure panel.

3. The pinch sensing arrangement for a closure panel of a motor vehicle of claim 2, wherein said mounting track includes a closure panel mounting portion adapted to attach to the closure panel, and further wherein said sensor is attached to said resiliently deflectable portion, said closure panel mounting portion being substantially perpendicular to said resiliently deflectable portion.

4. The pinch sensing arrangement for a closure panel of a motor vehicle of claim 1, wherein said mounting track is injection molded of plastic.

5. The pinch sensing arrangement for a closure panel of a motor vehicle of claim 1, wherein said mounting track is unitarily constructed.

6. A pinch sensing arrangement in combination with a motor vehicle having a body and a closure member mounted to the body, the closure member driven by a drive mechanism between an open position and a closed position, the pinch sensing arrangement comprising:

a mounting track adapted to be attached to one of the closure member and the body portion of the vehicle, said mounting tracks resiliently deflectable in a first direction under a first predetermined load;

a sealed sensor attached to said mounting track and elongated in a second direction substantially perpendicular to said first direction, said sensor operative for generating an electrical signal when compressed in a third direction by a second predetermined load, said third direction being substantially parallel to said second direction; and a control module in electrical communication with said sensor, said control module adapted to control said drive mechanism to articulate the closure member to the open position upon receiving said signal;

wherein said second predetermined load is less than said first predetermined load, the mounting track and the sensor are discrete elements and the mounting track permitting the sensor to be displaced after the electrical signal has been generated.

7. The pinch sensing arrangement in combination with a motor of claim 6, wherein said mounting track is attached to the closure panel.

8. The pinch sensing arrangement in combination with a motor vehicle of claim 7, wherein said mounting track includes a closure panel mounting portion adapted to attach to the closure panel and a sensor mounting portion to which the sensor is attached, said closure panel mounting portion being substantially perpendicular to said sensor mounting portion.

9. The pinch sensing arrangement in combination with a motor vehicle of claim 6, wherein the closure panel is pivotally mounted to the body of the vehicle.

10. The pinch sensing arrangement in combination with a motor vehicle of claim 6, wherein the closure panel is mounted for articulation about an articulation axis substantially perpendicular to a longitudinal axis of the vehicle.

11. The pinch sensing arrangement in combination with a motor vehicle of claim 7, wherein said sensor is elongated in a direction substantially perpendicular to said articulation axis.

12. The pinch sensing arrangement in combination with a motor vehicle of claim 9, wherein the closure panel includes first and second laterally spaced apart sides, said mounting track being attached to the closure panel proximate to one of said first and second laterally spaced apart sides.

13. The pinch sensing arrangement in combination with a motor vehicle of claim 6, wherein said mounting track is injection molded of plastic.

14. The pinch sensing arrangement in combination with a motor vehicle of claim 6, wherein said mounting track is unitarily constructed.

15. A motor vehicle comprising:

a body;

a liftgate mounted to the body for articulation about a laterally extending pivot axis between an open position and a closed position;

a drive mechanism for driving said closure member between said open position and said closed position;

a mounting track coupled to the liftgate, the mounting track being resiliently deflectable in a first direction under a first predetermined load;

a sealed sensor fixedly coupled to the mounting track and carried by said liftgate, said sensor operative for generating an electrical signal when compressed in a second direction under a second predetermined load, said second predetermined direction being substantially parallel to said first predetermined direction said second predetermined load being less than said first predetermined load; and a control module in electrical communication with said sensor, said control module for controlling said drive mechanism to articulate the liftgate to the open position upon receiving said signal;

wherein the mounting track and the sensor are discrete elements.

16. The motor vehicle of claim 15, wherein said mounting track includes a liftgate mounting portion attached to said liftgate and a sensor mounting portion being substantially perpendicular to said sensor mounting portion.

17. The motor vehicle of claim 15, wherein said liftgate includes first and second laterally spaced apart sides, said mounting track being attached to the liftgate proximate to one of said first and second laterally spaced apart sides.

18. The motor vehicle of claim 15, wherein said mounting track is unitarily constructed of an injection molded plastic.

* * * * *